United States Patent
Miyata et al.

(10) Patent No.: US 8,488,171 B2
(45) Date of Patent: Jul. 16, 2013

(54) RENDERING SYSTEM, METHOD FOR OPTIMIZING DATA, AND STORAGE MEDIUM

(75) Inventors: Akiyoshi Miyata, Yokohama (JP); Yutaka Myoki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 13/011,556

(22) Filed: Jan. 21, 2011

(65) Prior Publication Data

US 2011/0181912 A1     Jul. 28, 2011

(30) Foreign Application Priority Data

Jan. 28, 2010 (JP) ................. 2010-017007

(51) Int. Cl.
    *G06F 3/1293*     (2006.01)
    *G06K 9/456*     (2006.01)

(52) U.S. Cl.
    USPC ........ 358/1.15; 358/1.13; 358/1.18; 358/453; 358/462; 358/1.9; 382/159; 382/190; 382/180; 382/192

(58) Field of Classification Search
    USPC   382/159, 170–180, 190, 192; 358/1.13–1.18, 358/453, 462, 1.9
    See application file for complete search history.

(56) References Cited

U.S. PATENT DOCUMENTS

| | | | |
|---|---|---|---|
| 6,341,018 B1 * | 1/2002 | Vidyanand et al. | 358/1.18 |
| 6,919,967 B1 * | 7/2005 | Pentecost et al. | 358/1.15 |
| 7,505,172 B2 * | 3/2009 | Vondran et al. | 358/1.9 |
| 7,657,126 B2 * | 2/2010 | Gokturk et al. | 382/305 |
| 7,721,209 B2 * | 5/2010 | Tilton | 715/732 |
| 8,213,053 B2 * | 7/2012 | Chigusa | 358/2.1 |
| 8,243,322 B2 * | 8/2012 | Nakao et al. | 358/1.18 |
| 2005/0047647 A1 * | 3/2005 | Rutishauser et al. | 382/159 |
| 2005/0094191 A1 * | 5/2005 | Vondran et al. | 358/1.15 |
| 2006/0171254 A1 * | 8/2006 | Onishi et al. | 367/50 |
| 2007/0182991 A1 | 8/2007 | Matsuda | |
| 2008/0143735 A1 * | 6/2008 | Besley et al. | 345/582 |
| 2008/0144942 A1 * | 6/2008 | Besley et al. | 382/209 |
| 2010/0158355 A1 * | 6/2010 | Najafi et al. | 382/154 |

FOREIGN PATENT DOCUMENTS

| | | |
|---|---|---|
| JP | 2005-149347 A | 6/2005 |
| JP | 2007-213234 A | 8/2007 |

* cited by examiner

*Primary Examiner* — Dennis Dicker

(74) *Attorney, Agent, or Firm* — Canon USA, Inc., IP Division

(57) ABSTRACT

A rendering system includes a determination unit and a generation unit. The determination unit determines whether a processing object is a common object capable of being used a plurality of times and rendering of which is time-consuming when deformation thereof is performed. If the determination unit determines that the processing object is not a common object capable of being used a plurality of times and rendering of which is time-consuming when deformation thereof is performed, then the generation unit does not generate a deformed new object. If the determination unit determines that the processing object is a common object capable of being used a plurality of times and rendering of which is time-consuming when deformation thereof is performed, then the generation unit generates a deformed new object.

12 Claims, 15 Drawing Sheets

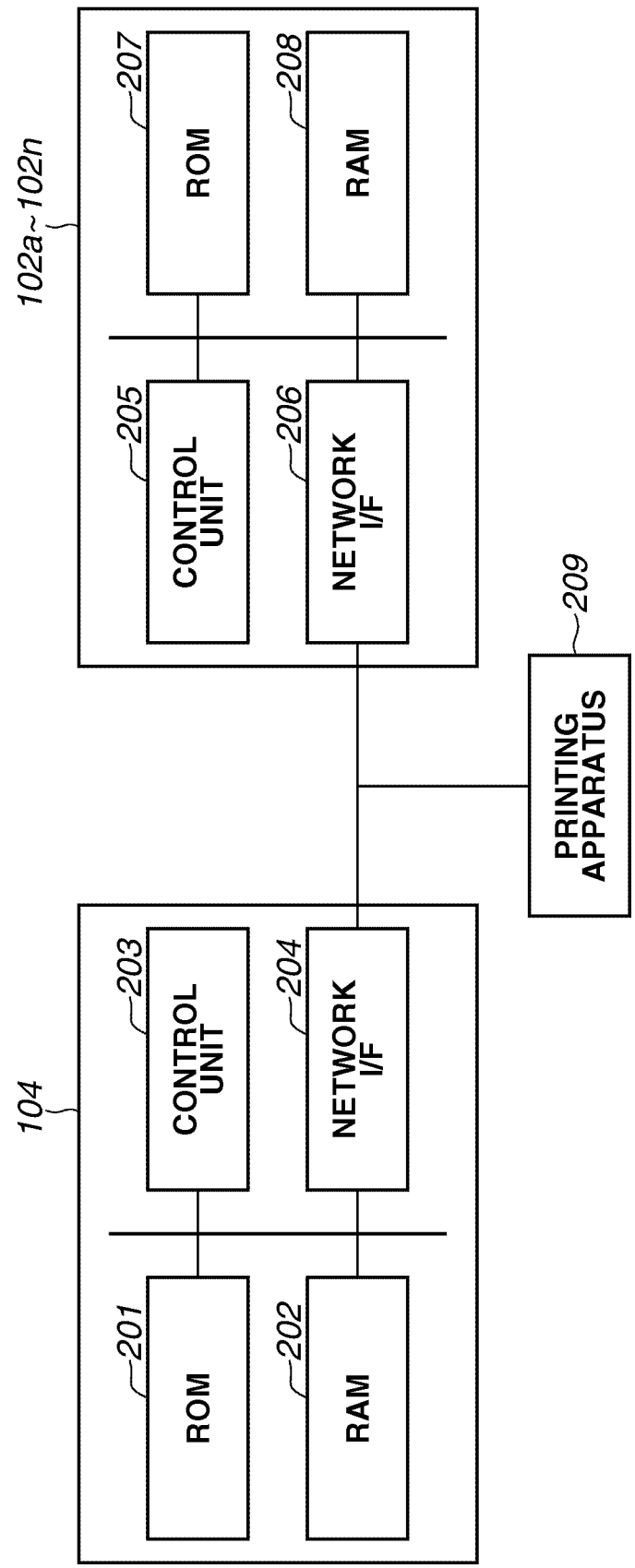

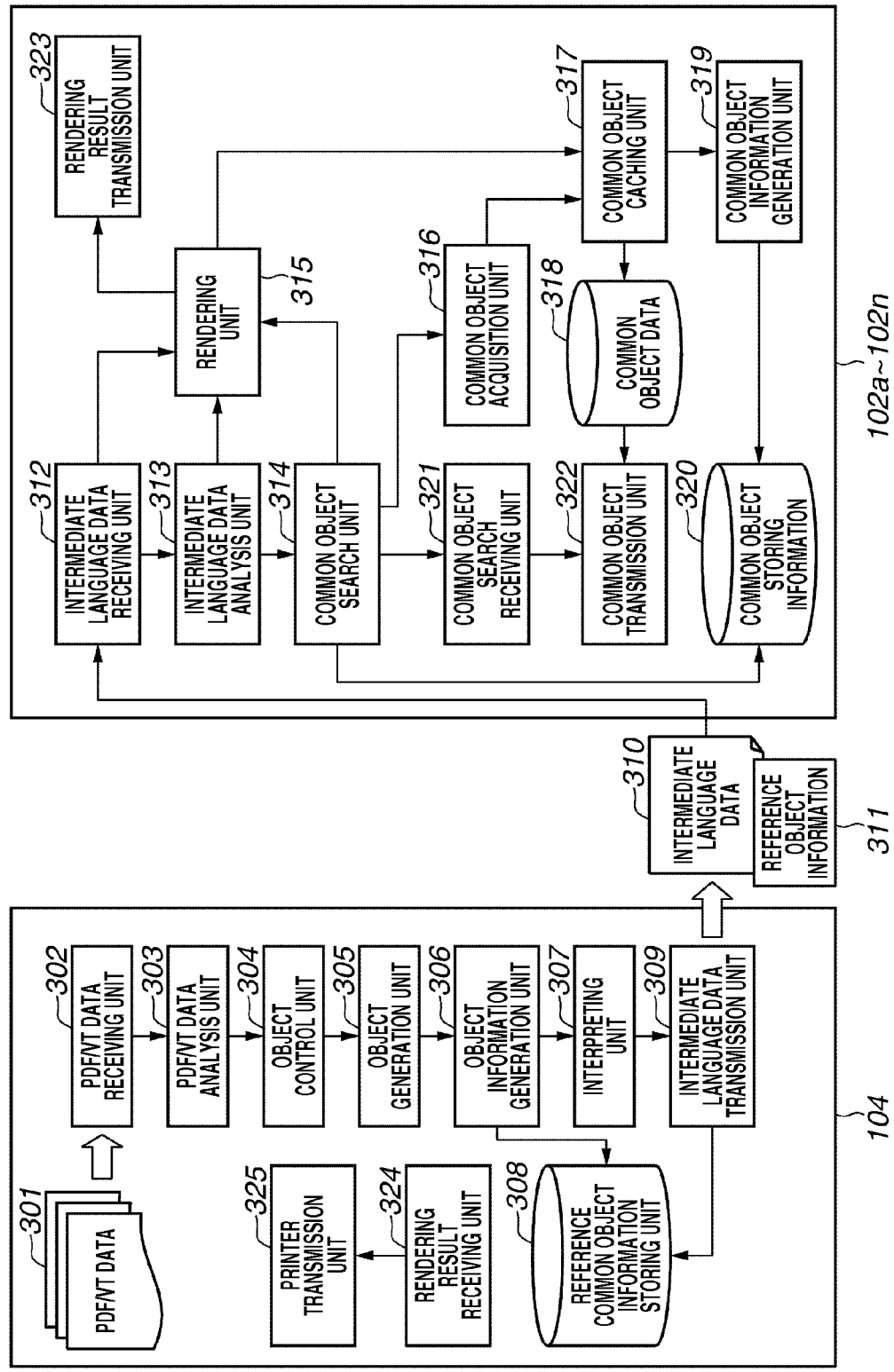

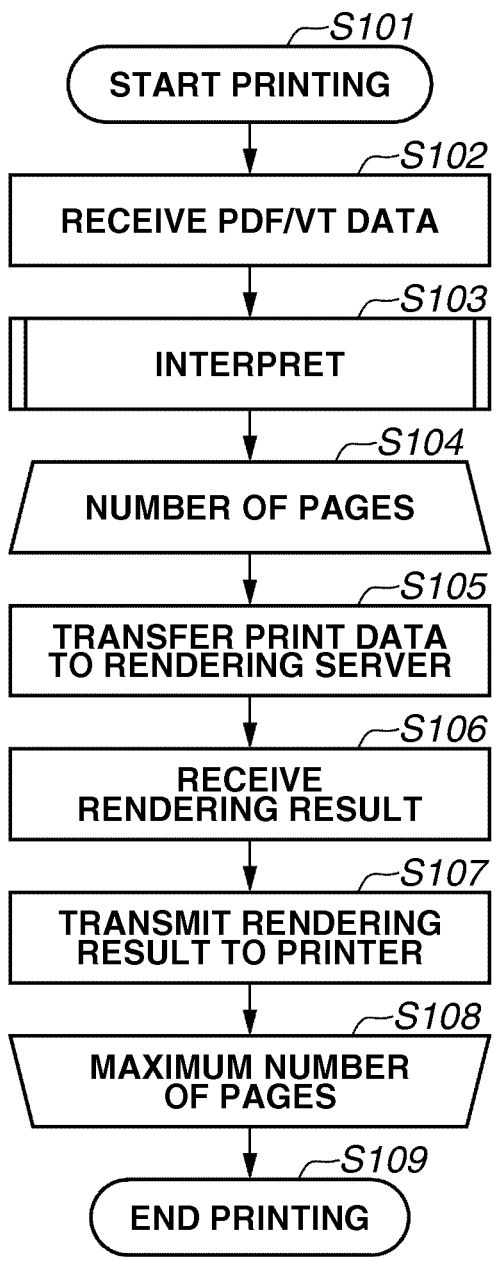

RENDERING SYSTEM, METHOD FOR OPTIMIZING DATA, AND STORAGE MEDIUM

BACKGROUND OF THE INVENTION

1. Field of the Invention

The present invention relates to a rendering system that renders (i.e., performs raster image processing (RIP) on) an object, a method for optimizing data, and a storage medium.

2. Description of the Related Art

Currently, it has become common to upload digital data in commercial printing services, such as printing of catalogues, pamphlets and advertisements, due to the development and spread of digitization and networks. Further, such use of digital data has lead to a spread of on-demand printing in which printing is performed as necessary when necessary. The digital commercial printing service is thus required to perform high-quality printing in a short time, so that high-speed and high quality printers are used in a system, or a plurality of servers are used to perform distributed processing.

The uploaded digital data employs PostScript or Portable Document Format (PDF) as a printing format. When such printing formats are employed, it becomes necessary to render (i.e., perform RIP on) the digital data by page. A plurality of server computers which performs rendering is thus used, or the pages are previously rendered by multithreading the process or performing multiprocessing, to distribute the processing load and thus realize high-speed printing. Furthermore, PDF/variable and transactional (VT) format which has been standardized in September 2007 is expected to be widely used as a printing format.

When such printing formats are employed, the rendering process cannot be divided by page in a case where there is an object that is commonly referred to by a plurality of pages, even when a plurality of rendering server computers is used. As a result, the digital data is transmitted to the rendering server computers in files instead of dividing by page, and the rendering server computer renders only the necessary page.

Japanese Patent Application Laid-Open No. 2005-149347 discusses a technique for distributing the printing load. Such a technique accumulates data on a time for which rendering has been performed in the past, then estimates a time for which rendering is to be performed when performing the subsequent rendering process, and distributes the rendering process. Further, Japanese Patent Application Laid-Open No. 2007-213234 discusses a method for performing the rendering process using a plurality of rendering server computers, so that each rendering server computer performs rendering in an ascending order or a descending order of pages.

Conventionally, high-speed rendering (RIP) has been developed to shorten the printing time. However, there has only been a focus on speeding up the rendering process, so that the speed of processing performed before the rendering process has not been increased. Further, since the print data cannot be divided by page, the print data is transmitted to all rendering server computers in files even when the system includes a plurality of rendering server computers. Each of the rendering server computers thus individually renders the object that is commonly referred to by the pages, so that the rendering server computers redundantly perform the same process with respect to the common object.

SUMMARY OF THE INVENTION

The present invention is directed to a rendering system capable of performing efficient printing by referring to a rendering result.

According to an aspect of the embodiments, a rendering system includes a determination unit and a generation unit. The determination unit determines whether a processing object is a common object capable of being used a plurality of times and rendering of which is time-consuming when deformation thereof is performed. If the determination unit determines that the processing object is not a common object capable of being used a plurality of times and rendering of which is time-consuming when deformation thereof is performed, then the generation unit does not generate a deformed new object. If the determination unit determines that the processing object is a common object capable of being used a plurality of times and rendering of which is time-consuming when deformation thereof is performed, then the generation unit generates a deformed new object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a block diagram illustrating configurations of a print server computer and a rendering server computer according to the first exemplary embodiment.

FIG. 3 illustrates a data-flow diagram of program code and data according to the first exemplary embodiment.

FIG. 7 is a flowchart illustrating a process performed by the rendering system according to the first exemplary embodiment.

DESCRIPTION OF THE EMBODIMENTS

Various exemplary embodiments, features, and aspects of the invention will be described in detail below with reference to the drawings.

Figure 1:
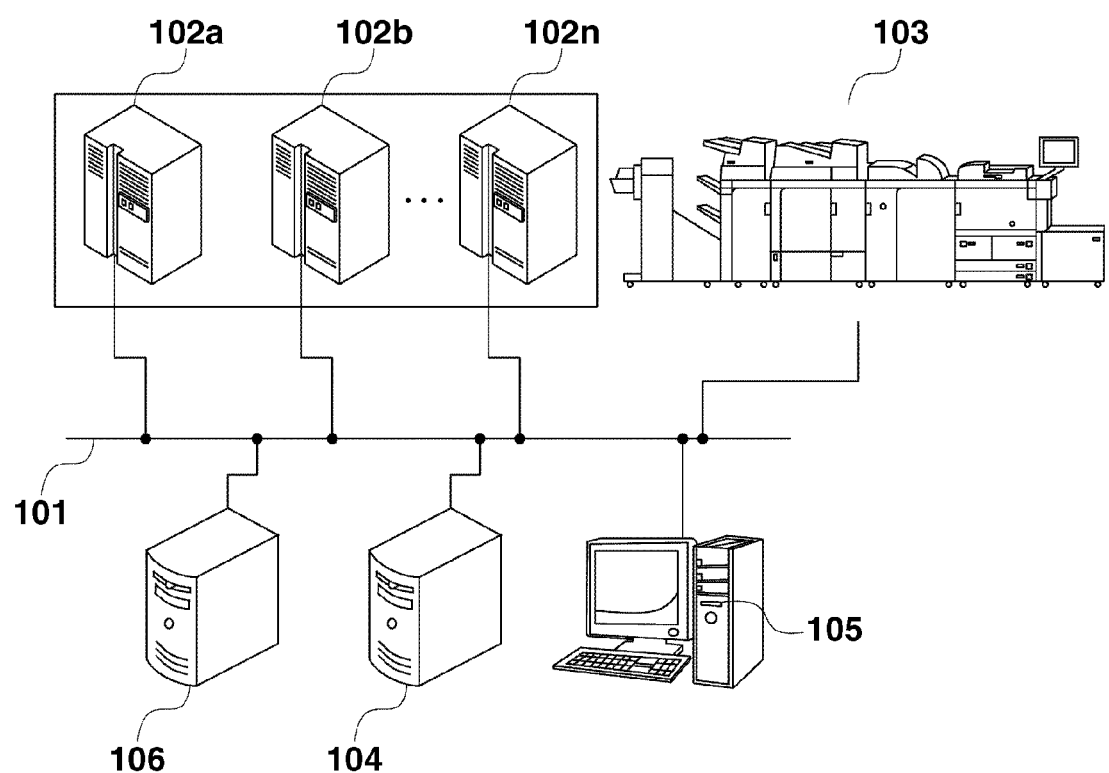
FIG. 1 illustrates a configuration of a rendering system according to a first exemplary embodiment.

FIG. 1 is a schematic diagram illustrating a configuration of a rendering system according to the first exemplary embodiment.

Referring to FIG. 1, a rendering system includes rendering server computers 102a to 102n, a client computer 105, a print server computer 104, a common object information management server 106, and a printing apparatus 103. Such components are connected via a network 101. The number of rendering server computers 102a to 102n is not limited, and the rendering system may include a plurality of rendering server computers. Further, the common object information management server 106 may be substituted by each of the rendering server computers 102a to 102n.

The client computer 105 transmits print data to the printer server computer 104 via the network 101. The print server computer 104 manages transmission and reception of data to and from various apparatuses connected to the network 101. Upon receiving the print data, the printing apparatus 103 starts printing.

FIG. 2 is a block diagram illustrating configurations of the print server computer 104 and the rendering server computers 102a to 102n according to the first exemplary embodiment.

Referring to FIG. 2, a control unit 203 in the print server computer 104 is a central processing unit (CPU). Further, a random access memory (RAM) 202 is a non-volatile large scale memory which stores various program codes and data files loaded from a read-only memory (ROM) 201. The ROM 201 stores computer programs to be executed by the control unit 203. Furthermore, a control unit 205 in the rendering server computers 102a to 102n is a CPU, and a RAM 208 is a non-volatile large scale memory which stores various program codes and data files loaded from a ROM 207. The ROM 207 stores computer programs to be executed by the control unit 205. A printing apparatus 209 is capable of transmitting data via a network or a cable.

A network interface (I/F) 204 in the print server computer 104 is capable of transmitting data via a network I/F 206 in the rendering server computers 102a to 102n and the network 101. According to the present exemplary embodiment, the program code is loaded in the RAM 202 and the RAM 208. However, the program code may be directly executed from the ROM 201 and the ROM 207.

FIG. 3 is a data-flow diagram illustrating a relationship between program code and data according to the present exemplary embodiment. According to the present exemplary embodiment, the PDF/VT format is described as an example of the print data format. However, the present exemplary embodiment can be applied to other print data formats such as the PDF.

Referring to FIG. 3, a PDF/VT data receiving unit 302 in the print server computer 104 receives PDF/VT data 301, i.e., print data, and the print server computer 104 then processes the print data to be processed. More specifically, the PDF/VT data receiving unit 302 transmits the PDF/VT data 301 to a PDF/VT data analysis unit 303. The PDF/VT data analysis unit 303 then acquires Reference XObject reference information from metadata in the PDF/VT data 301 and thus the information about the object that is commonly referred to. An object control unit 304 extracts the object in which it is necessary to newly generate a common object, based on the common object information extracted by the PDF/VT data analysis unit 303. An object generation unit 305 generates a new common object based on the common object extracted by the object control unit 304.

An object information generation unit 306 then rewrites the Reference XObject reference information in the metadata of the PDF/VT data 301 to the information about the new common object generated by the object generation unit 305. Further, the object information generation unit 306 acquires from the Reference XObject reference information in the metadata of the PDF/VT data 301, information about a number of times the object is referred to from each DPart. The DPart stores data for classifying, to layers of a page area, a page defined by the PDF/VT.

Furthermore, the object information generation unit 306 extracts, for each common object, a number of common objects that are referred to by the pages and writes the acquired number in a reference common object information storing unit 308. For example, if two common objects are used in both a first page and a second page, the reference common object information storing unit 308 of the first page stores information indicating that there are two common objects between the first and second pages. The reference common object information storing unit 308 stores a page number, common object information, and a transmitted page number.

An interpreting unit 307 uses the PDF/VT data generated by the object information generation unit 306 to generate intermediate language data 310. An intermediate language data transmission unit 309 then transmits, to the rendering server computers 102a to 102n, the intermediate language data 310 generated by the interpreting unit 307 and the common object information in the reference common object information storing unit 308 for each page. Further, the intermediate language data transmission unit 309 rewrites the information in the reference common object information storing unit 308.

A data receiving unit 312 in the rendering server computers 102a to 102n receives the intermediate language data 310, i.e., the print data from the intermediate language data transmission unit 309 in the print server computer 104. The rendering server computers 102a to 102n then process the received intermediate language data 310.

More specifically, the data receiving unit 312 transmits the received intermediate language data 310 to an intermediate language data analysis unit 313. The intermediate language data analysis unit 313 then confirms whether there is information about the common object that is referred to, based on reference object information 311 included in the received intermediate language data 310. If the intermediate language data analysis unit 313 receives a page of the intermediate language data 310 to be processed for the first time, the intermediate language data analysis unit 313 transfers the intermediate language data 310 and the common object information to a rendering unit 315.

On the other hand, if the intermediate language data analysis unit 313 receives the page of the intermediate language data 310 subsequent to the page received for the first time and confirms that there is no common object being referred to, the intermediate language data analysis unit 313 transmits the intermediate language data 310 to the rendering unit 315. The rendering unit 315 then renders the received intermediate language data 310. Further, if the intermediate language data analysis unit 313 receives the page of the intermediate language data 310 subsequent to the page received for the first time and confirms that there is a common object being referred to, the intermediate language data analysis unit 313 transmits the common object information to a common object search unit 314.

The common object search unit 314, which receives the common object information, then refers to a common object information storing unit 320. If the common object information does not exist in the common object information storing unit 320, the common object search unit 314 searches another rendering server computer for a common object that has been rendered. The common object search unit 314 searches another server computer based on the information about the common object being referred to. If the rendered common object is not found in another rendering server computer, the common object search unit 314 transmits the intermediate language data 310 to the rendering unit 315. If the rendered common object is found in another rendering server computer, the common object search unit 314 causes a common object acquisition unit 316 to acquire the rendered common object. The rendering unit 315 thus renders the intermediate language data 310.

If there is the common object being referred to in the reference object information transmitted from the intermediate language data analysis unit 313, the rendering unit 315 transmits the rendered common object and the common object information to a common object caching unit 317.

After rendering one page, the rendering unit 315 transmits the rendering result to a rendering result transmission unit 323.

The common object caching unit 317 caches, to a common object data storing unit 318, the rendering result of the common object generated by the rendering unit 315 or the rendering result of the common object acquired by the common object acquisition unit 316. The common object data storing unit 318 then caches the data of the rendered common object. A common object information generation unit 319 writes, in the common object information storing unit 320, the common object information stored in the rendering server computer for each page. The common object information storing unit 320 thus stores a page number and the common object information of the rendered common object.

When another rendering server computer inquires of the rendering server whether there is a common object, a common object search receiving unit 321 is capable of referring to the common object information storing unit 320 via the common object search unit 314. If the object searched by the common object search receiving unit 321 is found in the common object information storing unit 320, a common object transmission unit 322 accesses the common object data storing unit 318. The common object transmission unit 322 then transmits the cached common object data from the common object data storing unit 318 to the rendering server computer that has made the inquiry.

The rendering result transmission unit 323 transmits, to the print server computer 104, the rendering result of the intermediate language data generated by the rendering unit 315. A rendering result receiving unit 324 in the print server computer 104 receives and caches the rendering result received from the rendering result transmission unit 323. A printer transmission unit 325 then transmits, to the printer, the rendering result received by the rendering result receiving unit 324 in the order of pages. The printer receiving the rendering result thus performs printing.

Figure 4A:
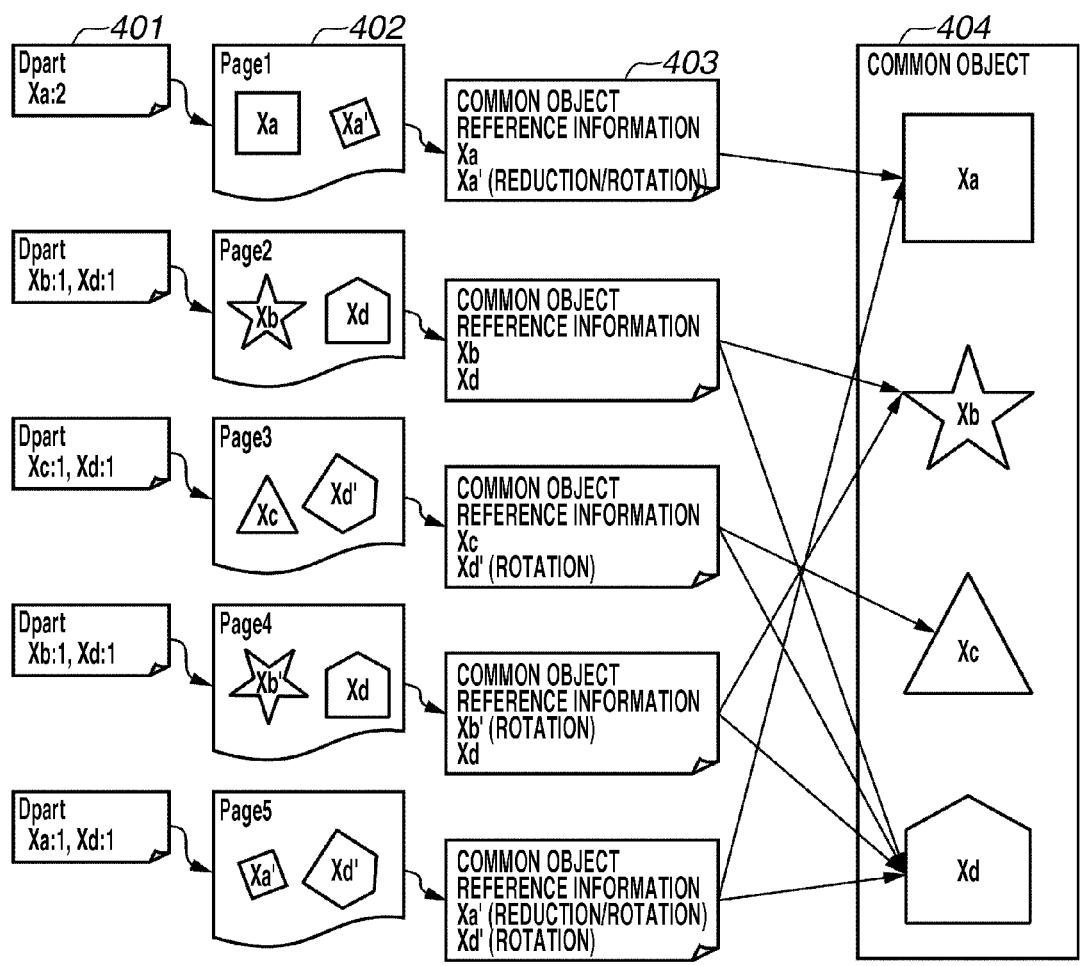
FIGS. 4A and 4B illustrate a process for deforming common objects.
Figure 4B:
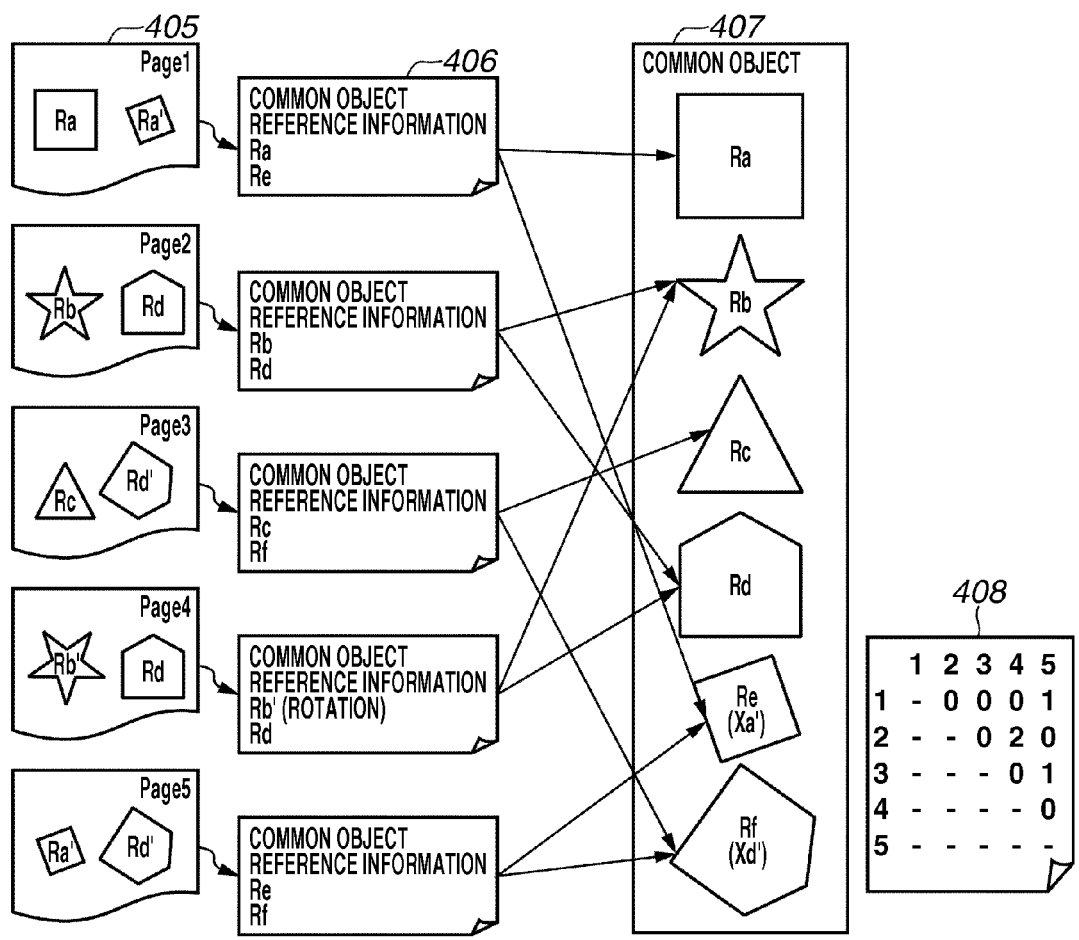

FIGS. 4A and 4B illustrate a process for newly generating a common object. The process is performed by the PDF/VT data analysis unit 303, the object control unit 304, the object generation unit 305, and the object information generation unit 306 in the print server computer 104 illustrated in FIG. 3.

More specifically, FIG. 4A illustrates a state of the PDF/VT data 301 that is input as the print data. FIG. 4B illustrates a state of optimized intermediate language data as a result of extracting the common object and newly generating a common object, including deformation of objects.

Referring to FIG. 4A, pages 402 are the PDF/VT data, i.e., the print data, received by the print server computer 104. Dparts 401 are the DParts included in the metadata of the PDF/VT data. Common object reference information 403 is the Reference XObject reference information in the metadata of the PDF/VT data. Common objects 404 are the object data commonly used by each page of the PDF/VT data.

Referring to FIG. 4B, pages 405 are the print data that has been converted to the intermediate language. Common object reference information 406 is the information about the object that is commonly referred to. Common objects 407 are the common object data acquired by newly generating the common object data that are referred to a plurality of times. "Newly generating" includes deformation of objects. Common object number information 408 indicates the number of common objects used by the plurality of pages. For example, "1, 2, 3, 4, 5" written in a first column on a left end and in an upper first row of the common object number information 408 indicate page numbers. Further, the common object information 408 indicates that there is one common object (i.e., Re) referred to by page 1 and page 5, two common objects (i.e., Rb and Rd) referred to by page 2 and page 4, and one common object (i.e., Rf) referred to by page 3 and page 5.

The PDF/VT data analysis unit 303 in the print server computer 104 refers to the Dparts 401 and the common object reference information 403 in the PDF/VT data illustrated in FIG. 4A, and acquires the information about the commonly used object. The object generation unit 305 then acquires the common object information that is acquired by the PDF/VT data analysis unit 303 and identifies the object to be newly generated. The object information generation unit 306 rewrites the common object reference information 403 of the PDF/VT data illustrated in FIG. 4A using the information about the newly generated common object. Further, the object information generation unit 306 generates the common object number information 408 based on the common object reference information 406, and stores the generated common object number information 408 in the reference common object information storing unit 308.

The interpreting unit 307 then generates the intermediate language data illustrated in FIG. 4B, based on the PDF/VT data generated by the object information generation unit 306. For example, page 1 among the pages 402 of the PDF/VT data refers to a common object Xa among the common objects 404, deforms the common object Xa by reducing and rotating the common object Xa, and generates a common object Xa'. Similarly, page 5 among the pages 402 in the PDF/VT data also refers to the common object Xa among the common objects 404, deforms the common object Xa by reducing and rotating the common object Xa, and generates the common object Xa'

The object generation unit 305 thus generates a common object Re among the common objects 407, which is a deformed image of the common object Xa among the common objects 404, that is necessary to be newly generated. The object information generation unit 306 then rewrites the common object Xa' in the common reference information 403 of page 1 and page 5 among the pages 402 of the PDF/VT data, to the common object Re. The interpreting unit 307 performs the interpreting process based on the PDF/VT data generated by the object information generation unit 306, and generates the common object number information 408 based on the common object reference information 406.

Further, since a common object Rb' in page 4 is not referred to by a plurality of pages, the deformed common object is not generated.

Figure 5:
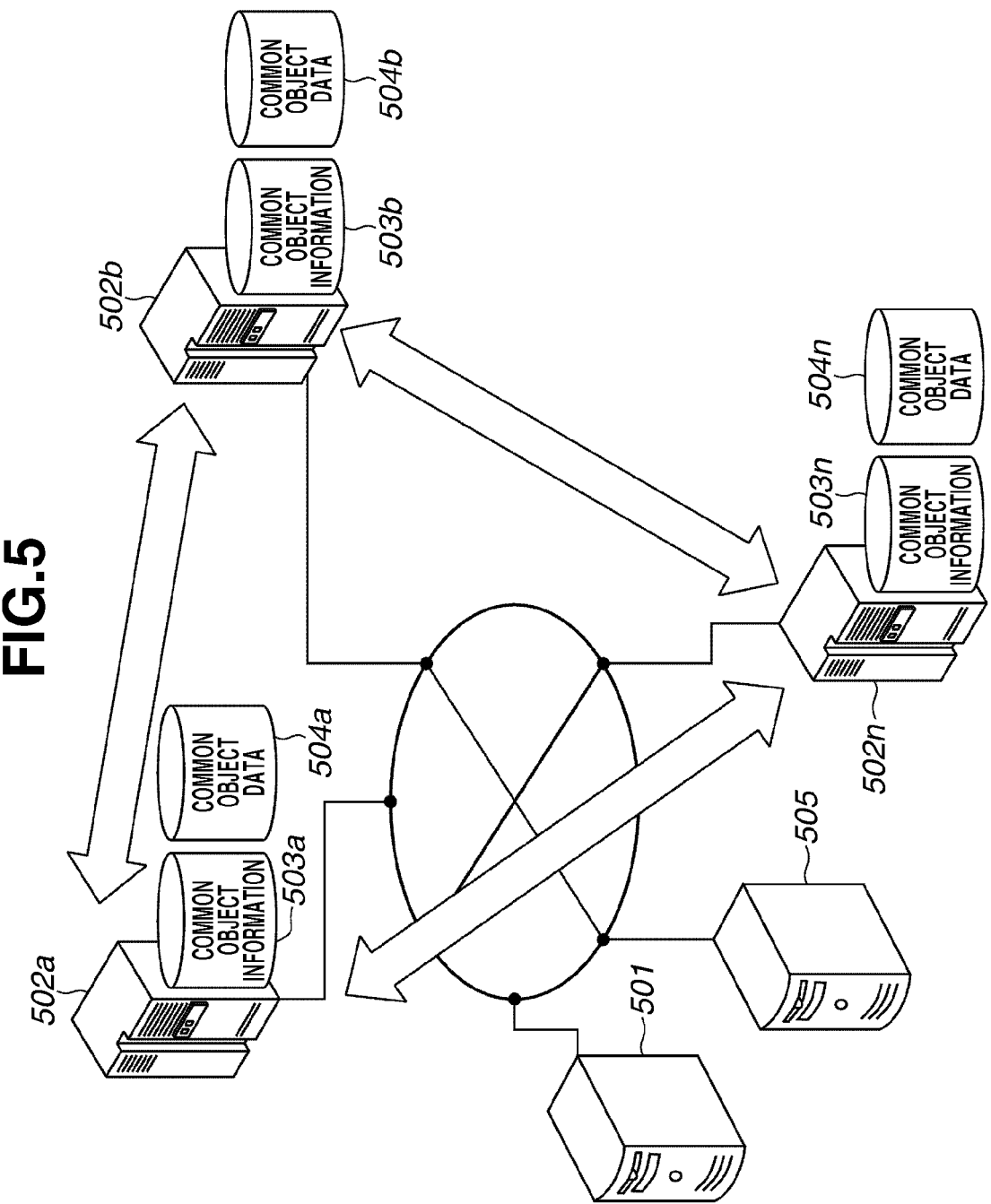
FIG. 5 illustrates an object search between servers.

FIG. 5 illustrates a common object search performed between the rendering server computers illustrated in FIG. 3.

Referring to FIG. 5, a print server computer 501 distributes the print data that has been converted to the intermediate language to rendering server computers 502a, 502b, and 502n. A common object information management server 505 stores the information of common object information storing units 503a, 503b, and 503n. The number of rendering server computers 502a, 502b, and 502n may be changed depending on the rendering system. The rendering server computers 502a, 502b, and 502n may also include the function of the common object information management server 505.

For example, the rendering server computer 502a can cache, to a common object data storing unit 504a, the object data rendered by the rendering server computer 502a or acquired from another rendering server computer. The rendering server computer 502a can also store the information about the cached common object data in the common object information storing unit 503a. The common object data storing unit 504a storing the rendered object data cached by the rendering server computer 502a and the common object information storing unit 503a storing the information about the cached common object data may be referred to by another rendering server computer.

When processing the intermediate language data that uses the common object data, the rendering server computer 502a refers to the common object information storing unit 503a and confirms whether there is information about the common object data that has previously been rendered by and stored in the rendering server computer 502a. If there is no such information about the common object data in the common object information storing unit 503a, the rendering server computer 502a inquires of the rendering server computers 502b and 502n and refers to the common object information storing units 503b and 503n. For example, if the common object data being searched for exists in the rendering server computer 502n, the rendering server computer 502a requests the rendering server computer 502n to transmit the common object data. Upon receiving the request for transmitting the data, the rendering server computer 502n transmits, to the rendering server computer 502a, the common object data from the common object data storing unit 504n in which the common object data is cached. The rendering server computer 502a which receives the common object data then caches the common object data to a common object data storing unit 504a and rewrites the information in the common object information storing unit 503a.

Further, the other rendering server computers include a similar processing function.

Figure 6A:
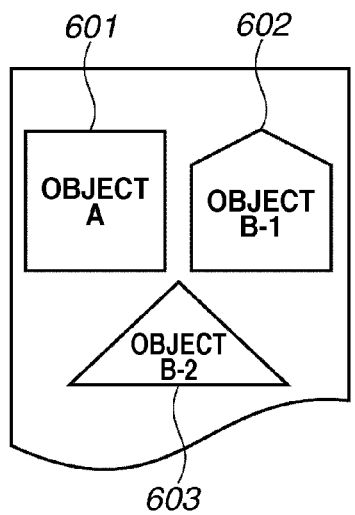
FIGS. 6A, 6B, and 6C illustrate intermediate language data and processes performed in the rendering server computer.
Figure 6B:
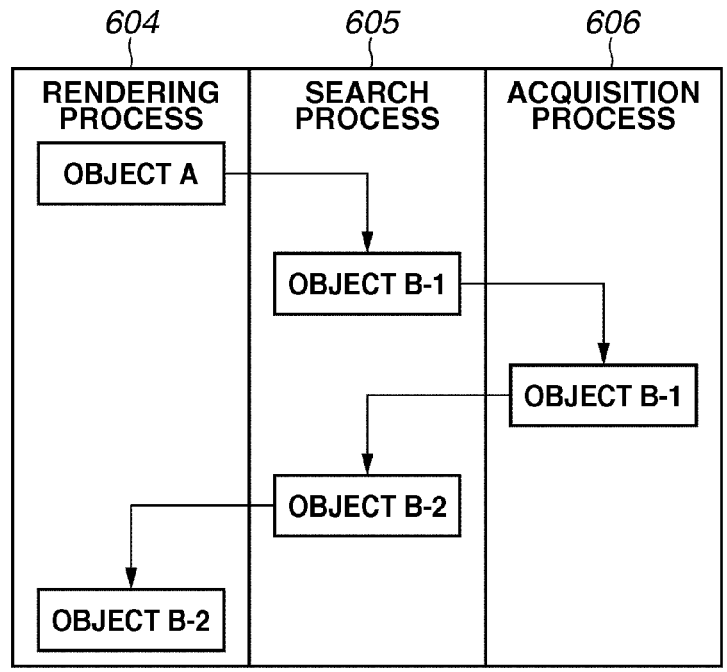
Figure 6C:
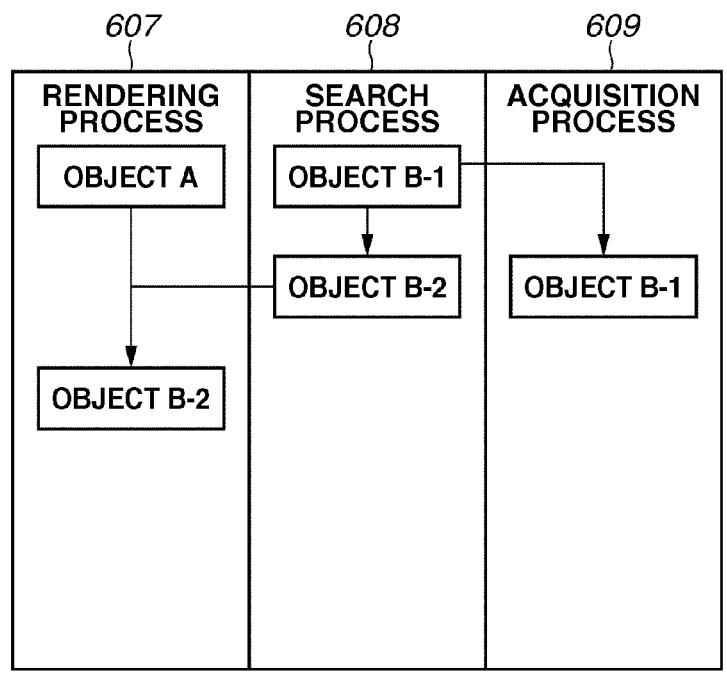

FIGS. 6B and 6C illustrate the processes performed for searching and acquiring, when intermediate language data illustrated in FIG. 6A is transmitted to the rendering server computer, the common object information in the rendering server computer.

Referring to FIG. 6A, the object data in the intermediate language data refers to object data 601 that is not a common object, and object data 602 that is a common object previously rendered by another rendering server computer. Further, the object data in the intermediate language data refers to object data 603 that is a common object and is not previously rendered by another rendering server computer.

FIG. 6B illustrates a case where a rendering process 604, a searching process 605, and an acquisition process 606 are serially performed on the object data.

Referring to FIG. 6B, the rendering unit 315 in the rendering server computer illustrated in FIG. 3 renders the object data 601 by performing the rendering process 604.

After the object data is rendered by the rendering unit 315 performing the rendering process 604, the common object search unit 314 searches another rendering server computer for the object data 602, i.e., a common object, by performing the searching process 605.

Upon the common object search unit 314 completing the search for the object data 602 by performing the searching process 605, the common object acquisition 316 acquires, by performing the acquisition process 606, the rendering result of the object data 602 from another rendering server computer. The common object caching unit 317 then caches the rendering result of the object data 602 acquired by the common object acquisition unit 316 to the common object data storing unit 318. Further, the common object information generation unit 319 stores, in the common object information storing unit 320, the common object information of the object data 602 cached by the common object caching unit 317.

After the object data 602 is acquired by performing the acquisition process 606, the common object search unit 314 searches another rendering server computer for the object data 603, i.e., the common object, by performing the searching process 605. If the object data 603 is not found in another rendering server computer, the common object search unit 314 transmits the object data 603 to the rendering unit 315.

Upon the common object search unit 314 completing the search for the object data 603 by performing the searching process 605, the rendering unit 315 renders the object data 603 by performing the rendering process 604.

FIG. 6C illustrates a case where a rendering process 607, a searching process 608, and an acquisition process 609 are independently performed in parallel.

Referring to FIG. 6C, the rendering unit 315 renders the object data 601 by performing the rendering process 607. In parallel, the common object search unit 314 searches another rendering server computer for the object data 602, i.e., the common object, by performing the searching process 608.

Upon completing the search for the object data 601 by performing the searching process 608, the common object search unit 314 searches another rendering server computer for the object data 603, i.e., the common object, by performing the searching process 608. In parallel, the common object acquisition unit 316 acquires, by performing the acquisition process 609, the rendering result of the object data 602 from another rendering server computer. The common object caching unit 317 then caches, to the common object data storing unit 318, the rendering result of the object data 602 acquired by the common object acquisition unit 316. Further, the common object information generation unit 319 stores, in the common object information storing unit 320, the common object information of the object data 602 cached by the common object caching unit 317.

After the common object search unit 314 searches for the object data 603 by performing the searching process 608, the rendering unit 315 renders the object data 603 by performing the rendering process 607.

FIG. 7 is a flowchart illustrating a process (from step S101 to step S109) performed by the rendering system according to the first exemplary embodiment illustrated in FIG. 3. A program for performing the flowchart illustrated in FIG. 7 is stored in a memory and executed by the CPU in the print server computer 104.

The PDF/VT data 301, i.e., the print data, is transmitted to the print server computer 104. In step S102, the PDF/VT data receiving unit 302 receives the PDF/VT data 301.

In step S103, the PDF/VT data analysis unit 303, the object control unit 304, the object generation unit 305, and the object information generation unit 306 analyze the PDF/VT data 301. Further, the interpreting unit 307 performs the processes for generating a common object rendering of which is time-consuming, and the intermediate language data 310.

In steps S104 to S108, the intermediate language data transmission unit 309 performs a process for repeating the processes of step S105 to step S107 with respect to the print data that has been converted to the intermediate language. In step S105, the intermediate data transmission unit 309 transmits, to the rendering server computer, the print data 310 that has been converted to the intermediate language. In step S106, the rendering result receiving unit 324 receives the rendering result of the print data transmitted from the rendering result transmission unit 323 in the rendering server computer, and then caches the rendering result. In step S107, the printer transmission unit 325 transmits, to the printer in the order of pages, the rendering result cached by the rendering result receiving unit 324.

Figure 8:
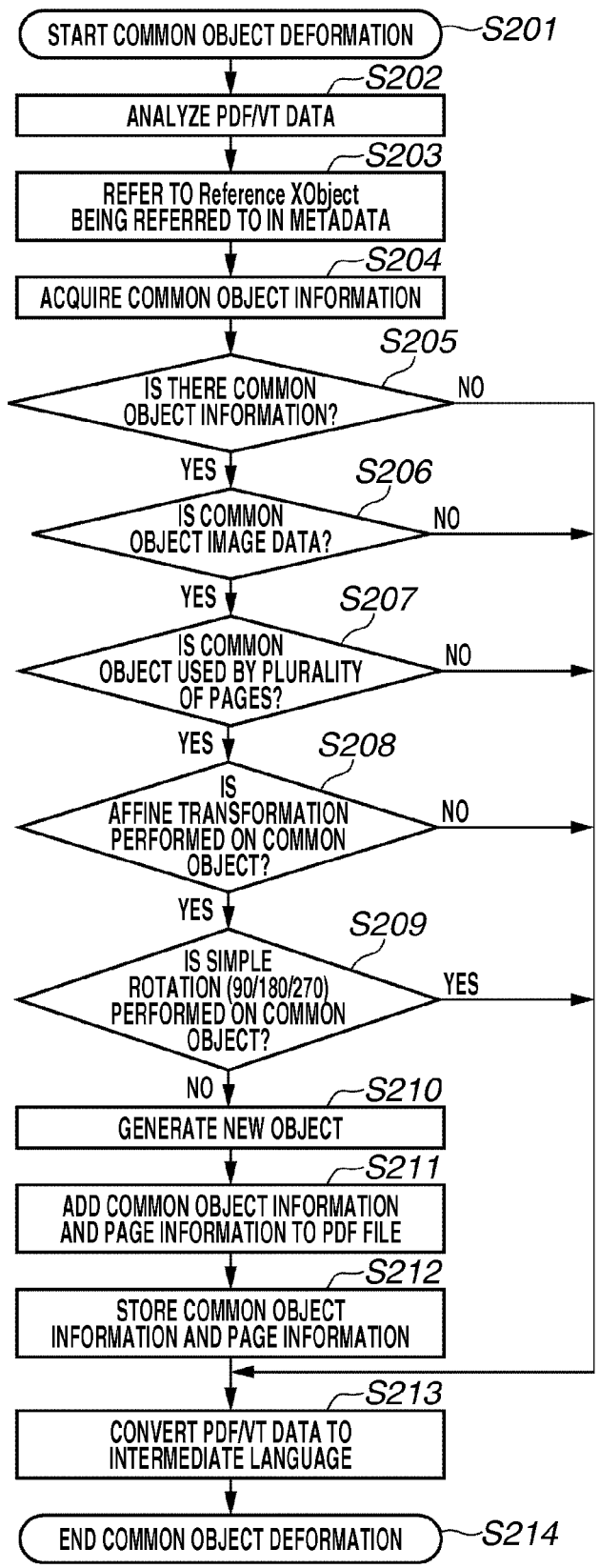
FIG. 8 is a flowchart illustrating details of an interpreting process.

FIG. 8 is a flowchart illustrating in detail a process (from step S201 to step S214) performed in step S103 illustrated in FIG. 7, i.e., the process performed by the PDF/VT data analysis unit 303, the object control unit 304, the object generation unit 305, the object information generation unit 306, and the interpreting unit 307 illustrated in FIG. 3. The program for performing the process of the flowchart illustrated in FIG. 8 is stored in the memory and executed by the CPU in the print server computer 104.

In step S202, the PDF/VT data analysis unit 303 analyzes the PDF/VT data, i.e., the print data.

In step S203, the PDF/VT data analysis unit 303 analyzes the structure of the PDF/VT data and refers to the Reference XObject reference information in the metadata. In step S204, the PDF/VT data analysis unit 303 acquires, from the common object reference information 403 acquired in step S203, information about the common object referred to by each page.

In step S205, the object control unit 304 determines whether there is a common object that is referred to a plurality of times, based on the common object reference information 403 acquired in step S204. The object control unit 304 determines the number of times the same object name has appeared. If the object control unit 304 determines that there is a common object (YES in step S205), the process proceeds to step S206. On the other hand, if the object control unit 304 determines that there is no common object (NO in step S205), the process proceeds to step S213.

In step S206, the object control unit 304 determines whether the common object is image data by analyzing the structure of the PDF/VT data and confirming the graphics status in the Reference XObject using the metadata. If the object control unit 304 determines that the common object is image data (YES in step S206), the process proceeds to step S207. If the object control unit 304 determines that the common object is not image data (NO in step S206), the process proceeds to step S213.

In step S207, the object control unit 304 determines whether the common object is referred to by a plurality of pages by confirming the number of times the object name has appeared, using the common object reference information 403 acquired in step S204 and referred to by each page. If the object control unit 304 determines that the object is referred to by a plurality of pages (YES in step S207), the process proceeds to step S208. If the object control unit 304 determines that the object is not referred to by a plurality of pages (NO in step S207), the process proceeds to step S213.

In step S208, the object control unit 304 determines whether affine transformation is performed on the common object by analyzing the PDF/VT data structure and confirming an image coordinate system. More specifically, the object control unit 304 determines whether the object is enlarged, reduced, translated, or subjected to reversal processing by affine transformation, and thus rendering of the object is time-consuming. If the object control unit 304 determines that the affine transformation is performed on the common object (YES in step S208), the process proceeds to step S209. On the other hand, if the object control unit 304 determines that the affine transformation is not performed on the common object (NO in step S208), the process proceeds to step S213.

In step S209, the object control unit 304 determines whether simple rotation is performed on the common object by comparing image coordinate system information and a simple rotation value. If the object control unit 304 determines that simple rotation is not performed on the common object (NO in step S209), the process proceeds to step S210. If the object control unit 304 determines that simple rotation is performed on the common object (YES in step S209), the process proceeds to step S213. The simple rotation process is generally performed in high speed using hardware or software. However, the process may proceed to step S210 in a case where simple rotation that is performed on the common object cannot be performed in high speed due to hardware performance.

In step S210, the object generation unit 305 generates a new object.

In step S211, the object information generation unit 306 rewrites the Reference XObject reference information in the metadata of the PDF/VT data to the information about the new common object generated by the object generation unit 305 in step S210.

In step S212, the object information generation unit 306 rewrites the common object reference information 403 referred to by each page and acquired in step S204, and stores the common object reference information 403 in the reference common object information storing unit 308.

In step S213, the interpreting unit 307 converts the PDF/VT data, i.e., the print data, to the intermediate language and generates the intermediate language data 310.

Figure 9:
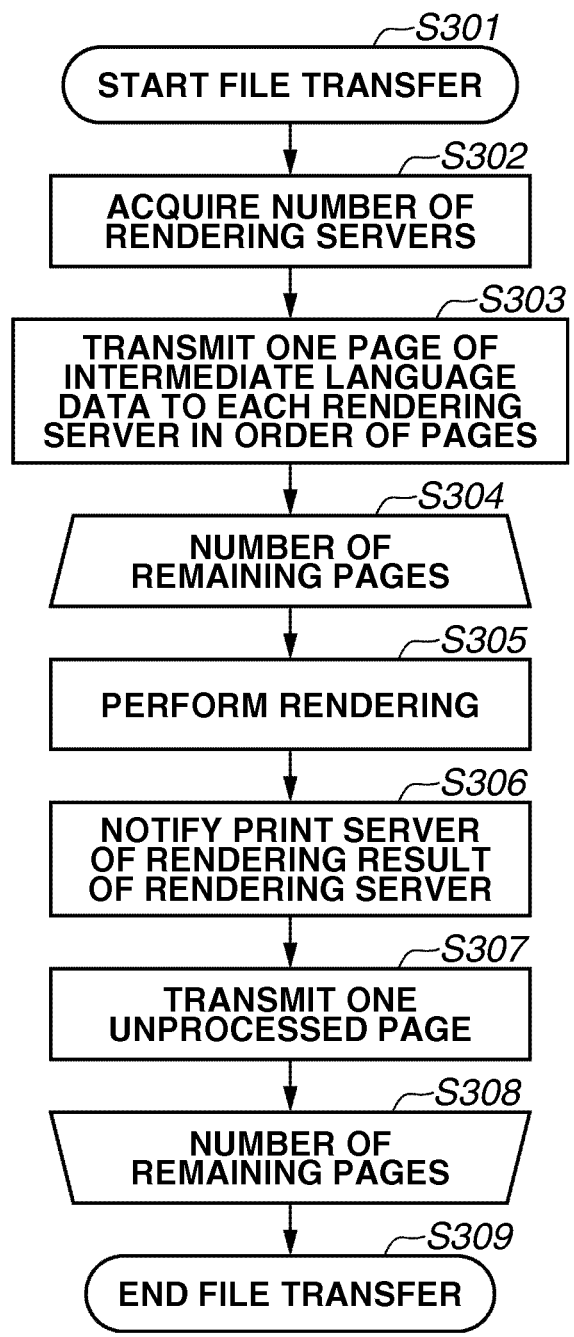
FIG. 9 is a flowchart illustrating a process for transmitting intermediate language data in which there is no common object.

FIG. 9 illustrates a process (from step S301 to step S309) performed when the common object is not used in a plurality of pages of the intermediate language data 310 generated in the print server computer 104. More specifically, FIG. 9 is a flowchart illustrating a process performed by the intermediate language data transmission unit 309 in the print server computer 104 for transmitting the intermediate language data 310 to the rendering server computer. Further, FIG. 9 illustrates in detail the processes performed in step S105 and step S106 of the flowchart illustrated in FIG. 7. The program for performing the process illustrated by the flowchart in FIG. 9 is stored in the memory and executed by the CPU in the print server computer 104.

The intermediate language transmission unit 309 refers to the common object reference information generated by the object information generation unit 306 and stored in the reference common object information storing unit 308. The intermediate language transmission unit 309 then determines whether the intermediate language data 310 to be transferred includes the common object used by a plurality of pages.

In step S302, the intermediate language data transmission unit 309 acquires the number of rendering server computers. The number of rendering server computers may be previously stored in the print server computer 104.

In step S303, upon start of transmission, the intermediate language data transmission unit 309 sequentially transmits one page of the intermediate language data 310 to each of the rendering server computer. Further, the intermediate language data transmission unit 309 stores, in the reference common object information storing unit 308, the transmitted page number and the information about the rendering server computer to which the intermediate language data 310 is transmitted.

In steps S304 to S308, the rendering server computer performs a process for repeating the processes of step S305 to step S307 by a number of times equal to the difference between the total number of pages and the transmitted number of pages of the PDF/VT data 301.

In step S305, the rendering unit 315 in the rendering server computer renders one page of the intermediate language data 310 received by the rendering server computer.

In step S306, the rendering result transmission unit 323 transmits, to the rendering result receiving unit 324, the rendering result generated by the rendering unit 315.

In step S307, the intermediate language data transmission unit 309 transmits, to the rendering server computer, one page of the intermediate language data 310 that has not been transmitted, based on the transmitted page number stored in the reference common object information storing unit 308. Further, the intermediate language data transmission unit 309 stores, in the reference common object information storing unit 308, the transmitted page number and the information about the rendering server computer to which the page of the intermediate language data 310 is transmitted.

Figure 10:
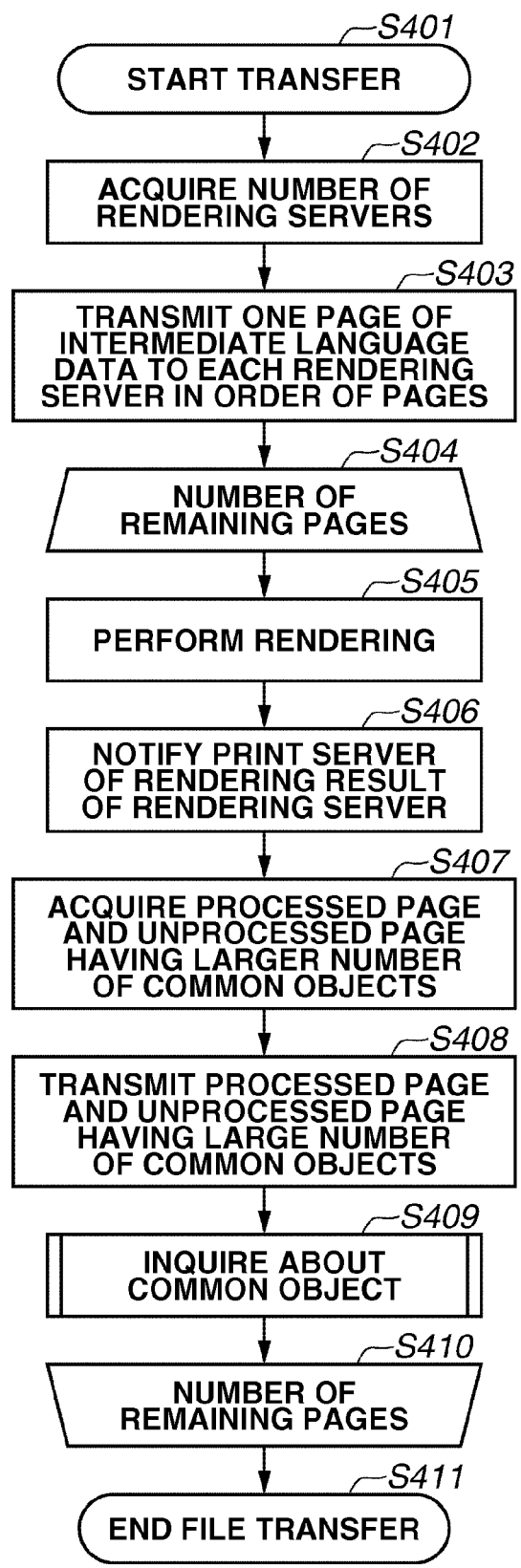
FIG. 10 is a flowchart illustrating a process for transmitting intermediate language data in which there is a common object.

FIG. 10 is a process (from step S401 to step S411) performed when the common object is used in a plurality of pages of the intermediate language data 310 generated in the print server computer 104 illustrated in FIG. 3. More specifically, FIG. 10 is a flowchart illustrating the process performed by the intermediate language data transmission unit 309 for transmitting the intermediate language data 310 to the rendering server computer. Further, FIG. 9 illustrates in detail the processes performed in step S105 and step S106 illustrated in FIG. 7. The program for performing the process illustrated by the flowchart in FIG. 10 is stored in the memory and executed by the CPU in the print server computer 104.

The intermediate language transmission unit 309 refers to the common object reference information generated and stored in the reference common object information storing unit 308 by the object information generation unit 306. The intermediate language transmission unit 309 then determines whether the intermediate language data 310 to be transmitted includes the common object to be used in a plurality of pages.

The PDF/VT data 301 including the common object referred to by a plurality of pages is interpreted, and the intermediate language data 310 is thus generated. In step S402, the intermediate language data transmission unit 309 then acquires the number of rendering server computers. The number of rendering server computers may be previously stored in the print server computer 104.

In step S403, upon starting transmission, the intermediate language data transmission unit 309 sequentially transmits one page of the intermediate language data 310 to each rendering server computer. Further, the intermediate language data transmission unit 309 stores, in the reference common object information storing unit 308, the transmitted page number and the information about the rendering server computer to which the intermediate language data 310 is transmitted.

In steps S404 to S410, the intermediate language data transmission unit 309 performs a process for repeating the processes of step S405 to step S409 by a number of times equal to the difference between the total number of pages and the transmitted number of pages of the PDF/VT data 301.

In step S405, the rendering unit 315 renders one page of the intermediate language data 310 received by the rendering server computer.

In step S406, the rendering result transmission unit 323 transmits, to the rendering result receiving unit 324, the rendering result generated by the rendering unit 315.

In step S407, the intermediate language data transmission unit 309 acquires the transmitted page information that the intermediate language data transmission unit 309 stored in the reference common object information storing unit 308. The intermediate language data transmission unit 309 also acquires, from the common object data storing unit 318, the common object data generated by the object information generation unit 306. The intermediate language data transmission unit 309 then compares the acquired transmitted page information and the common object data and acquires an unprocessed page number. In other words, the intermediate language data transmission unit 309 acquires the unprocessed page number using both the page numbers and the transmitted page numbers stored in the reference common object information storing unit 308. The intermediate language data transmission unit 309 then searches for the page that refers to a large number of common objects, based on the acquired unprocessed page number and the common object information stored in the reference common object information storing unit 308 (i.e., common object number information 408).

In step S408, the intermediate language data transmission unit 309 transmits, to the rendering server computer, an unprocessed page of the intermediate language data 310 found in step S407.

In step S409, the common object search unit 314 searches the rendering server computer for the common object.

More specifically, the process will be described below with reference to the common object number information 408 illustrated in FIG. 4B, which is an example of the data stored in the reference common object information storing unit 308. The intermediate language data transmission unit 309 transmits the first page to a server A, and the second page to a server B. After the server A renders the first page, the intermediate language data transmission unit 309 transmits, to the server A, the fifth page that includes the common object between the first page, instead of the third page, among the third, fourth, and fifth pages that are unprocessed. After the server B renders the second page, the intermediate language data transmission unit 309 transmits, to the server B, the fourth page that includes a greater number of common objects between the second page, instead of the third page, among the third and fourth pages that are unprocessed. As a result, caching of the common object becomes effective, and the rendering server computer becomes capable of performing high-speed rendering. After the server A renders the fifth page, the intermediate language data transmission unit 309 transmits, to the server A, the third page that is unprocessed.

Figure 11:
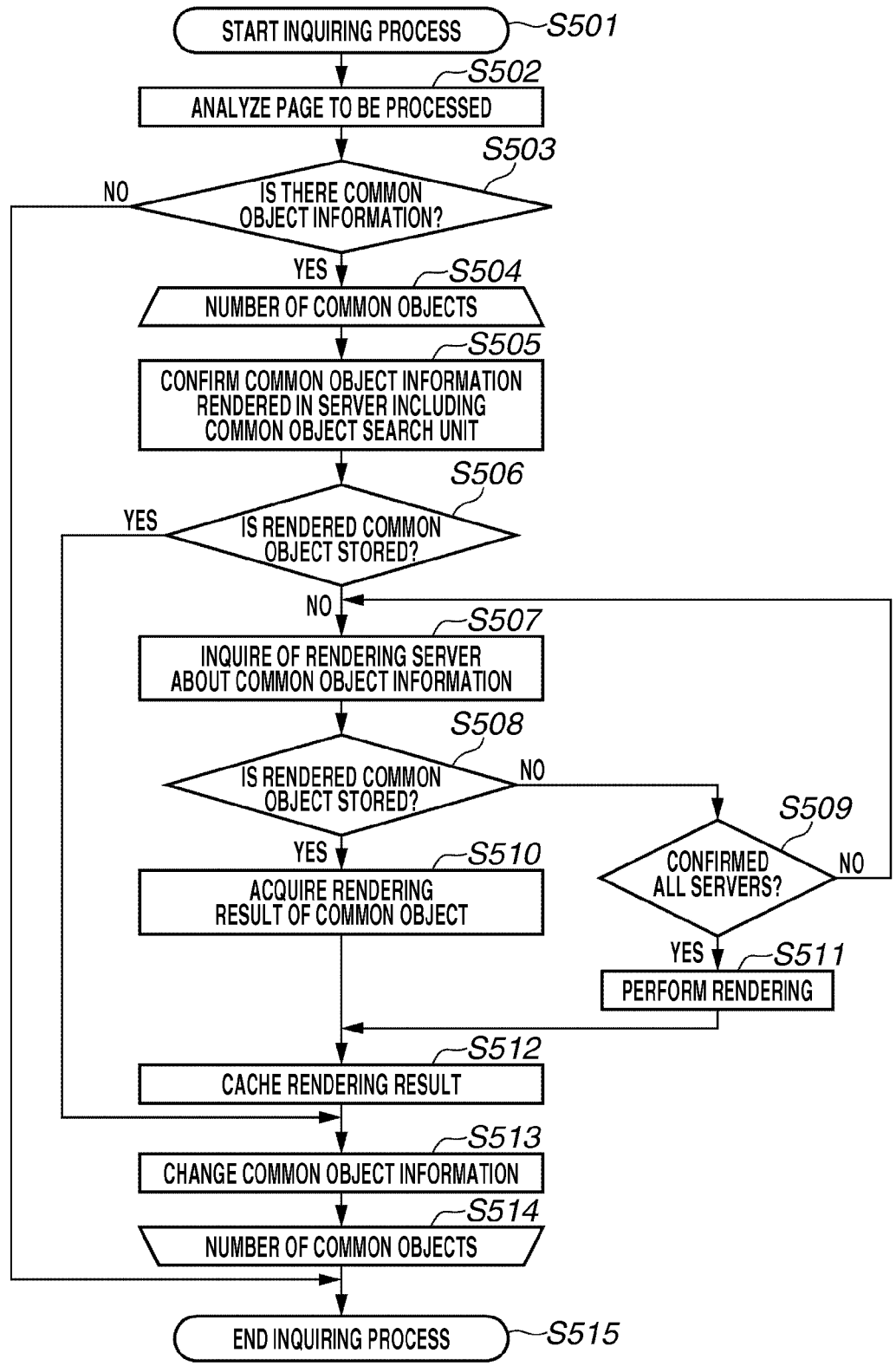
FIG. 11 is a flowchart illustrating details of a process for inquiring about a common object according to the first exemplary embodiment.

FIG. 11 illustrates in detail a process (from step S501 to step S515) performed in step S409 illustrated in FIG. 10. More specifically, FIG. 11 is a flowchart illustrating the process performed by the rendering server computer illustrated in FIG. 3 for acquiring the rendered common object by searching for the common object. The program for performing the process illustrated in the flowchart of FIG. 11 is stored in the memory and executed by the CPU in the rendering server computer.

In step S502, after the intermediate language data receiving unit 312 receives the intermediate language data 310, the intermediate language data analysis unit 313 acquires the reference object information 311 from the received intermediate language data 310.

In step S503, the intermediate language data analysis unit 313 determines whether there is common object information in the reference object information 311 acquired from the intermediate language data 310. If the intermediate language data analysis unit 313 determines that there is the common object information (YES in step S503), the process proceeds to step S504. On the other hand, if the intermediate language data analysis unit 313 determines that there is no common object information (NO in step S503), the process proceeds to step S515.

In steps S504 to S514, a process is performed for repeating the processes performed in step S505 to step S513.

In step S505, the common object search unit 314 acquires, from the common object information storing unit 320, the information about the common object that has previously been rendered by the rendering server computer in which the common object search unit 314 is included.

In step S506, if the common object search unit 314 determines that there is the information about the common object that has previously been rendered by the rendering server computer including the common object search unit 314 (YES in step S506), the process proceeds to step S513. If the common object search unit 314 determines that there is no information about the common object that has previously been rendered by the rendering server computer including the common object search unit 314 (NO in step S506), the process proceeds to step S507.

In step S507, the common object search unit 314 confirms another rendering server computer on whether there is a rendered common object. The common object search unit 314 may confirm, in an arbitrary order, whether there is a rendered common object in another rendering server computer.

In step S508, the common object search unit 314 determines whether there is a rendered common object in another rendering server computer. If there is a rendered common object (YES in step S508), the process proceeds to step S513. If there is no rendered common object in another rendering server computer (NO in step S508), the process proceeds to step S509.

In step S509, the common object search unit 314 confirms whether all rendering server computers have been searched. If all of the rendering server computers have been searched (YES in step S509), the process proceeds to step S511. If not all of the rendering server computers have been searched (NO in step S509), the process proceeds to step S507.

In step S510, the common object acquisition unit 316 acquires, from the rendering server computer in which the rendered common object exists, the rendering result of the common object data.

In step S511, the rendering unit 315 renders the common object.

In step S512, the common object caching unit 317 caches, to the common object data storing unit 318, the rendered common object acquired from another rendering server computer in step S510. Further, the common object caching unit 317 caches, to the common object data storing unit 318, the common object rendered in step S511.

In step S513, the common object information generation unit 319 writes, in the common object information storing unit 320, the common object cached in step S512.

Figure 12:
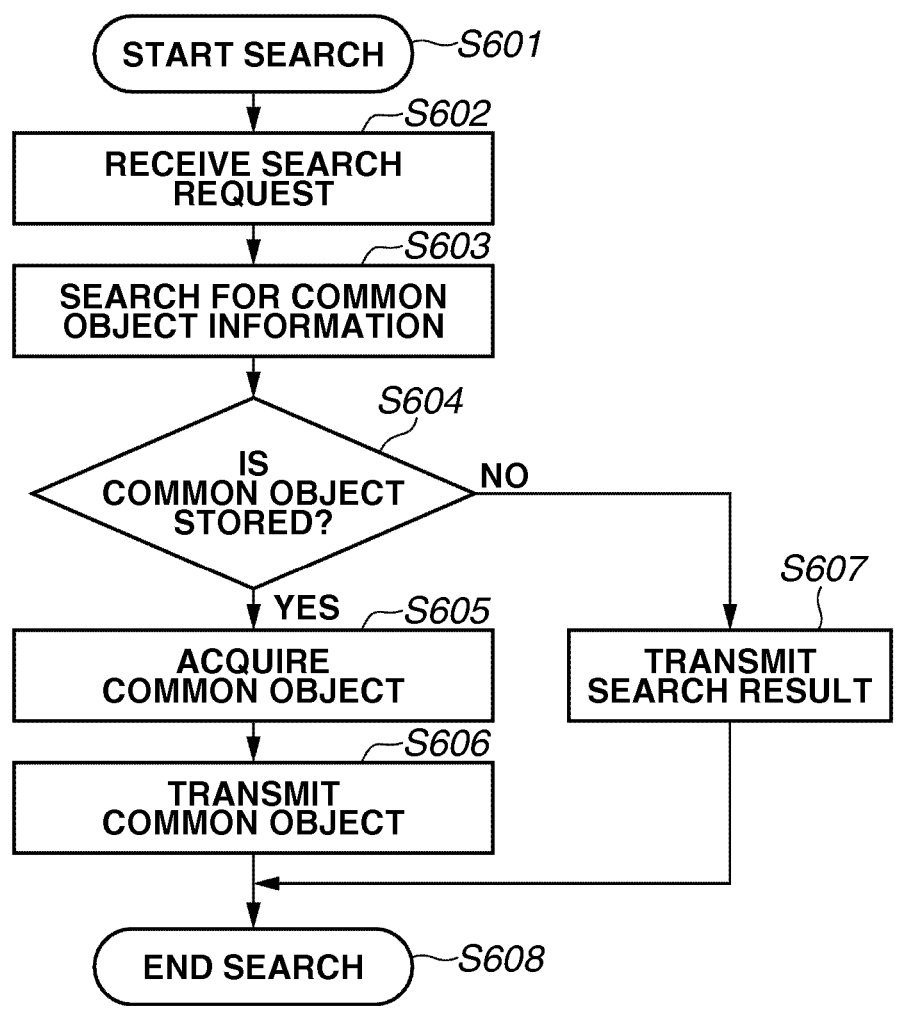
FIG. 12 is a flowchart illustrating a process for searching for a common object.

FIG. 12 is a flowchart illustrating a process (from step S601 to step S608) invoked by the process performed in step S507 of the flowchart illustrated in FIG. 11. More specifically, FIG. 12 is a flowchart illustrating a process in which the rendering server computer is searched by another rendering server computer for the common object and then transmits the common object. The program for performing the process illustrated in the flowchart of FIG. 12 is stored in the memory and executed by the CPU in the rendering server computer.

In step S602, the common object search receiving unit 321 receives a request from another rendering server computer to search for the rendering result of the common object.

In step S603, the common object search receiving unit 321 refers to and searches the common object information storing unit 320 for the common object, via the common object search unit 314.

In step 604, the common object search receiving unit 321 determines whether the common object information storing unit 320 stores the common object. If the common object information storing unit 320 stores the common object (YES in step S604), the process proceeds to step S605. If the common object information storing unit 320 does not store the common object (NO in step S604), the process proceeds to step S607.

In step S605, the common object transmission unit 322 acquires the common object from the common object data storing unit 318 in which the common object is cached.

In step S606, the common object transmission unit 322 transmits the common object acquired from the common object data storing unit 318 to the rendering server computer that has requested the search.

In step S607, the common object transmission unit 322 transmits, to the rendering server computer that has requested the search, a reply indicating that there is no common object.

According to the first exemplary embodiment, the common object is acquired by sequentially searching the rendering server computer for the common object. However, the search method may be changed depending on the configuration of the rendering system.

Figure 13:
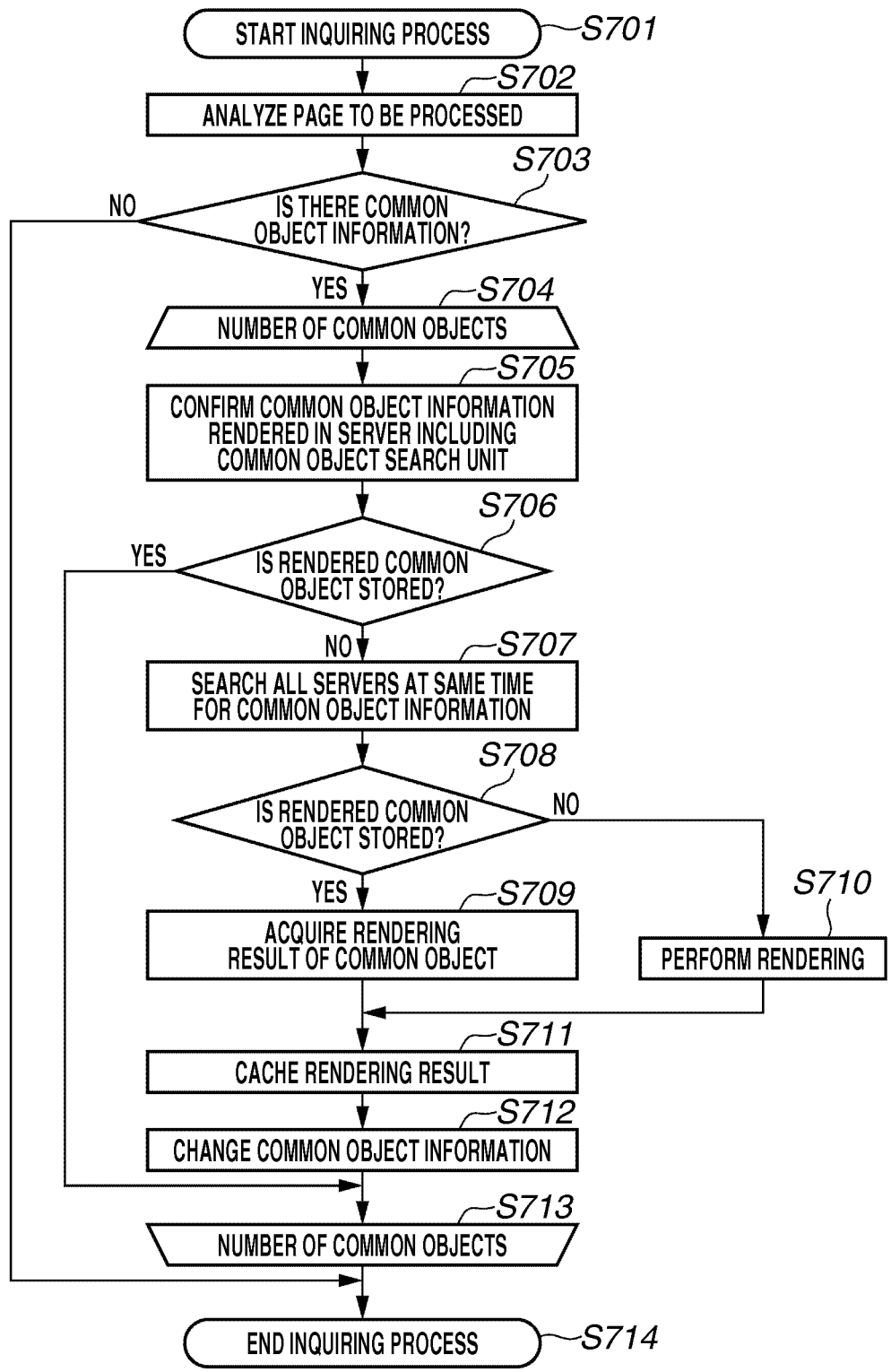
FIG. 13 is a flowchart illustrating in detail a process for inquiring about a common object according to a second exemplary embodiment.

FIG. 13 is a flowchart illustrating in detail a process (from step S701 to step S714) performed in step S409 illustrated in FIG. 10 according to a second exemplary embodiment. More specifically, FIG. 13 is a flowchart illustrating a process for searching other rendering server computers at the same time for the common object and acquiring the common object. The program for performing the process illustrated in the flowchart of FIG. 13 is stored in the memory and executed by the CPU in the rendering server computer.

The intermediate language data receiving unit 312 in the rendering server computer receives the intermediate language data from the print server computer 104. In step S702, the intermediate language data analysis unit 313 then acquires the reference object information 311 in the received intermediate language data 310.

In step S703, the intermediate language data analysis unit 313 determines whether there is the common object information, based on the reference object information 311 acquired from the intermediate language data 310. If the intermediate language data analysis unit 313 determines that there is the common object information (YES in step S703), the process proceeds to step S704. On the other hand, if the intermediate language data analysis unit 313 determines that there is no common object information (NO in step S703), the process proceeds to step S714.

In steps S704 to S713, a process is performed for repeating the processes performed in step S705 to step S712.

In step S705, the common object search unit 314 acquires, from the common object information storing unit 320, the information about the common object that is previously rendered in the rendering server computer in which the common object search unit 314 is included.

In step S706, if the common object search unit 314 determines that there is the information about the common object that is previously rendered in the rendering server computer including the common object search unit 314 (YES in step S706), the process proceeds to step S713. If the common object search unit 314 determines that there is no information about the common object that is previously rendered in the rendering server computer including the common object search unit 314 (NO in step S706), the process proceeds to step S707.

In step S707, the common object search unit 314 confirms all of the other rendering server computers at the same time whether there is the rendered common object.

In step S708, if the common object search unit 314 determines that there is the rendered common object in another rendering server computer (YES in step S708), the process proceeds to step S709. If the common object search unit 314 determines that there is no rendered common object in another rendering server computer (NO in step S708), the process proceeds to step S710.

In step S709, the common object acquisition unit 316 acquires, from the rendering server computer in which the rendered common object exists, the rendering result of the common object.

In step S710, the rendering unit 315 renders the common object.

In step S711, the common object caching unit 317 caches, to the common object data storing unit 318, the common object acquired in step S709. Further, the common object caching unit 317 caches, to the common object data storing unit 318, the common object rendered in step S710.

In step S712, the common object information generation unit 319 stores, in the common object information storing unit 320, the information about the common object cached in step S711.

In the first and the second exemplary embodiments, the rendering server computer is inquired whether there is the common object. According to a third exemplary embodiment, a rendering system that includes a common object information management server storing the common object information will be described below.

The common object information management server computer stores page numbers of the intermediate language data, the common object information for each page, information on whether rendering has been performed, and information about the rendering server computer that has performed rendering.

Figure 14:
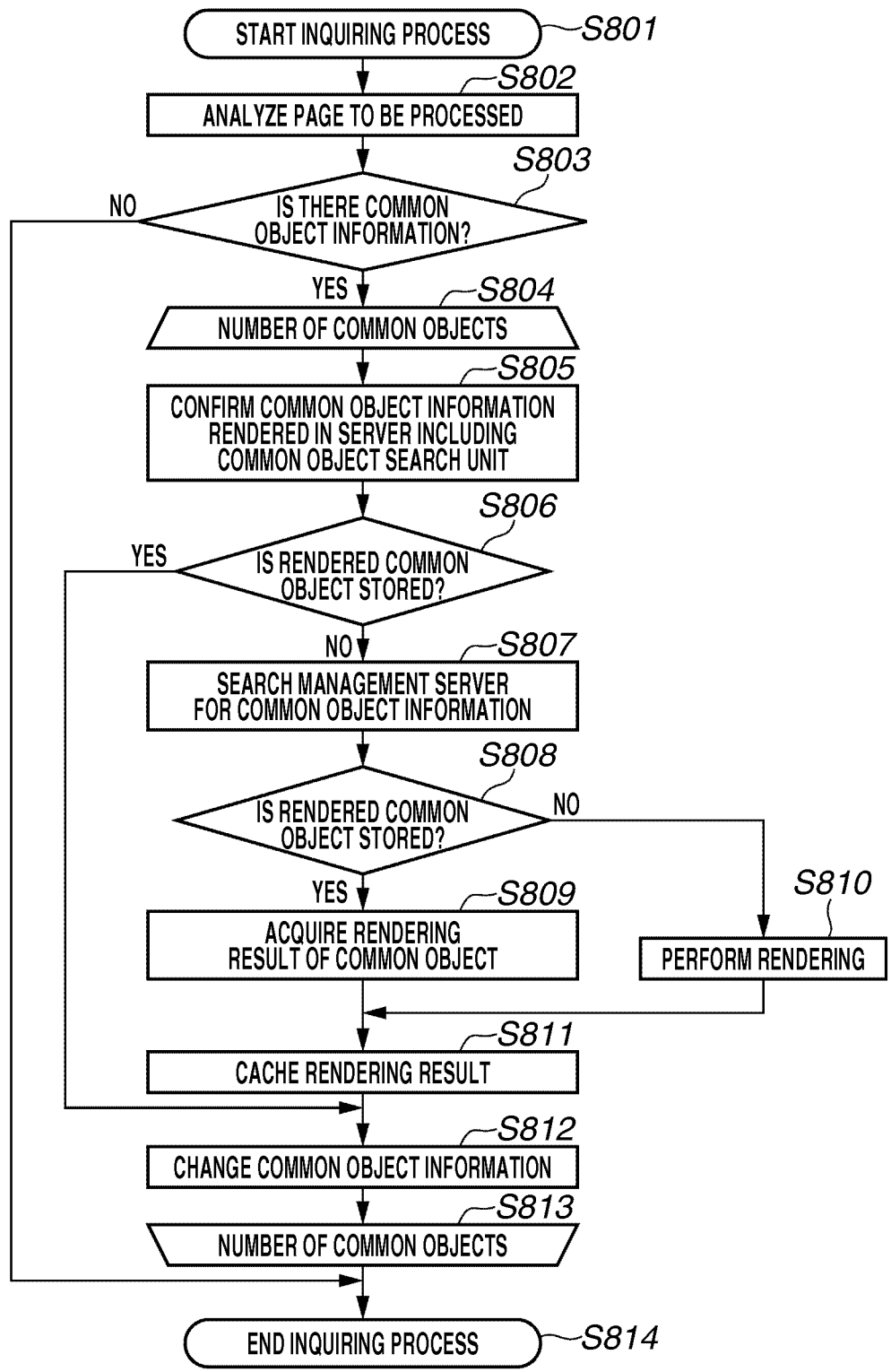
FIG. 14 is a flowchart illustrating in detail a process for inquiring about a common object according to a third exemplary embodiment.

FIG. 14 is a flowchart illustrating in detail a process (from step S801 to step S814) performed in step S409 illustrated in FIG. 10 according to the third exemplary embodiment. More specifically, FIG. 14 is a flowchart illustrating the process for managing the common object information in the management server and thus determining the rendering server computer that includes the common object. The program for performing the process illustrated in the flowchart of FIG. 14 is stored in the memory and executed by the CPU in the rendering server computer.

The intermediate language data receiving unit 312 receives the intermediate language data 310 from the print server computer 104. In step S802, the intermediate language data analysis unit 313 then acquires, from the received intermediate language data 310, the reference object information 311.

In step S803, the intermediate language data analysis unit 313 determines whether there is the common object information, using the reference object information 311 acquired from the intermediate language data 310. If the intermediate language data analysis unit 313 determines that there is the common object information (YES in step S803), the process proceeds to step S804. On the other hand, if the intermediate language data analysis unit 313 determines that there is no common object information (NO in step S803), the process proceeds to step S814.

In steps S804 to S813, a process is performed for repeating the processes performed in step S805 to step S812.

In step S805, the common object search unit 314 acquires, from the common object information storing unit 320, the information about the common object that has been previously rendered in the rendering server computer in which the common object search unit 314 is included.

In step S806, if the common object search unit 314 determines that there is the information about the common object that has been previously rendered in the rendering server computer including the common object search unit 314 (YES in step S806), the process proceeds to step S812. If the common object search unit 314 determines that there is no information about the common object that has been previously rendered in the rendering server computer including the common object search unit 314 (NO in step S806), the process proceeds to step S807.

In step S807, the common object search unit 314 confirms the common object information management server whether there is the rendered common object in another rendering server computer.

In step S808, if the common object search unit 314 determines that there is the rendered common object in another rendering server computer (YES in step S808), the process proceeds to step S809. If the common object search unit 314 determines that there is no rendered common object in another rendering server computer (NO in step S808), the process proceeds to step S810.

In step S809, the common object acquisition unit 316 acquires, from the common object information management server the information about the rendering server computer in which there is the rendered common object. The common object acquisition unit 316 then acquires the rendering result of the common object from the rendering server computer.

In step S810, the rendering unit 315 renders the common object.

In step S811, the common object caching unit 317 caches, to the common object data storing unit 318, the rendered common object acquired in step S809. Further, the common object caching unit 317 caches, to the common object data storing unit 318, the common object rendered in step S810.

In step S812, the common object information generation unit 319 stores, in the common object information storing unit 320, the information about the common object cached in step S811.

According to the exemplary embodiments, the speed of transferring and rendering the print data is improved by converting the print data to the intermediate language so that the print data can be divided into pages. Further, each rendering server computer shares the rendering result of the commonly used object with the other rendering server computers. As a result, unnecessary rendering is not performed, and the print speed is improved. Furthermore, the common object information is acquired using the metadata and is used to distribute transmission of the print data to the rendering server computers. Efficient distribution can thus be performed.

According to the exemplary embodiments, the rendering speed can be improved. The embodiments also may be achieved by performing processing. Specifically, software (program) implementing the functions of the above-mentioned exemplary embodiments is supplied to the system or apparatus through a network or various storage media, and a computer (or CPU or micro processing unit (MPU)) in the system or apparatus loads and executes the program. Each apparatus may be implemented within, include, or otherwise be connected to a central processing unit (CPU), where the CPU is connected to a memory and executes a variety of functions by executing a variety of application programs that are stored in the memory, such as a read only memory (ROM). The ROM may store such information as an operating system, various applications, a control program, and data. The operating system may be the software that controls the allocation and usage of hardware resources such as memory, central processing unit, disk space, and peripheral devices. A random access memory (RAM) may temporarily store the program or the data that is loaded from the ROM. The RAM also is used as a space wherein the CPU executes the variety of programs. In an example, a computer-readable medium or a computer-readable storage medium may store a program that causes a rendering system to perform a method described herein. In another example, a central processing unit may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-017007 filed Jan. 28, 2010, which is hereby incorporated by reference herein in its entirety.

What is claimed is:

1. A rendering system comprising:
a determination unit configured to determine whether a processing object is a common object capable of being used a plurality of times and rendering of which is time-consuming when deformation thereof is performed;
a generation unit configured not to generate, if the determination unit determines that the processing object is not a common object capable of being used a plurality of times and rendering of which is time-consuming when deformation thereof is performed, a deformed new object, and configured to generate, if the determination unit determines that the processing object is a common object capable of being used a plurality of times and rendering of which is time-consuming when deformation thereof is performed, a deformed new object;
a reference information generation unit configured to generate, after the generation unit generates a deformed new object, reference information indicating a number of times a common object is referred to from each page; and
a plurality of rendering server computers,
wherein the reference information is used when distributed processing of object rendering is performed by the plurality of rendering server computers.

2. The rendering system according to claim 1, wherein the common object capable of being used a plurality of times and rendering of which is time-consuming when deformation thereof is performed includes image data.

3. The rendering system according to claim 1, wherein the deformation includes performing affine transformation.

4. The rendering system according to claim 1, wherein each of the plurality of rendering server computers includes
an inquiring unit configured to inquire of another rendering server computer whether there is a rendered object, and
an acquisition unit configured to acquire, from another rendering server computer, a rendered common object, based on a result acquired by the inquiring unit.

5. The rendering system according to claim 1, wherein each of the plurality of rendering server computers includes
a storing unit configured to store information indicating that a rendered object exists, and
an acquisition unit configured to acquire, from another rendering server computer, a rendered common object, based on information stored by the storing unit.

6. The rendering system according to claim 1, wherein each of the plurality of rendering server computers includes
an inquiring unit configured to inquire of a common object information management server whether there is a rendered object in another rendering server computer, and
an acquisition unit configured to acquire, from another rendering server computer, a rendered common object, based on a result acquired by the inquiring unit.

7. The rendering system according to claim 1, further comprising: a transmission unit configured to transmit, when rendering is started, one page of information to the plurality of rendering server computers, and transmit, to the plurality of rendering server computers, an unprocessed page among subsequent pages, in which there is a large number of objects that are in common with a previously rendered page.

8. The rendering system according to claim 1, wherein each of the plurality of rendering server computers performs parallel processing of object rendering and acquisition of a rendered object from another rendering server computer.

9. A data optimization method, comprising:
determining whether a processing object is a common object capable of being used a plurality of times and rendering of which is time-consuming when deformation thereof is performed;
not generating, if it is determined that the processing object is not a common object capable of being used a plurality of times and rendering of which is time-consuming when deformation thereof is performed, a deformed new object, and generating, if it is determined that the processing object is a common object capable of being used a plurality of times and rendering of which is time-consuming when deformation thereof is performed, a deformed new object;
generating, after generating a deformed new object, reference information indicating a number of times a common object is referred to from each page; and
rendering, wherein the reference information is used when distributed processing of object rendering is performed by rendering.

10. The data optimization method according to claim 9, further comprising: generating, after the deformed new object is generated, reference information indicating a number of times a common object is referred to from each page,
wherein the reference information is used when distributed processing of object rendering is performed by a plurality of servers.

11. A non-transitory computer-readable storage medium storing computer-executable instructions that cause a computer to perform a method, the method comprising:
determining whether a processing object is a common object capable of being used a plurality of times and rendering of which is time-consuming when deformation thereof is performed;
not generating, if it is determined that the processing object is not a common object capable of being used a plurality of times and rendering of which is time-consuming when deformation thereof is performed, a deformed new object, and generating, if it is determined that the processing object is a common object capable of being used a plurality of times and rendering of which is time-consuming when deformation thereof is performed, a deformed new object;

generating, after generating a deformed new object, reference information indicating a number of times a common object is referred to from each page; and rendering, wherein the reference information is used when distributed processing of object rendering is performed by rendering.

12. The non-transitory computer-readable storage medium according to claim 11, wherein the method further comprises:
generating, after the deformed new object is generated, reference information indicating a number of times a common object is referred to from each page,
    wherein the reference information is used when distributed processing of object rendering is performed by a plurality of servers.

* * * * *